Sept. 22, 1953  G. E. ARNIO  2,652,905
TRACTOR HAND BRAKE
Filed Jan. 8, 1951  2 Sheets-Sheet 1

George E. Arnio
INVENTOR.

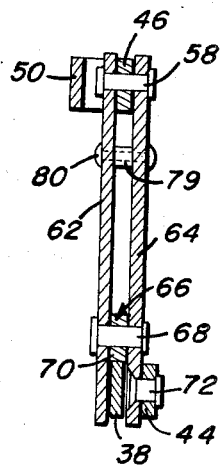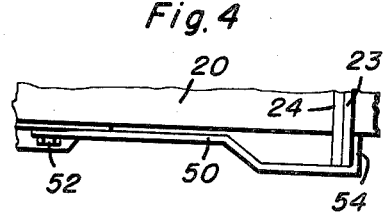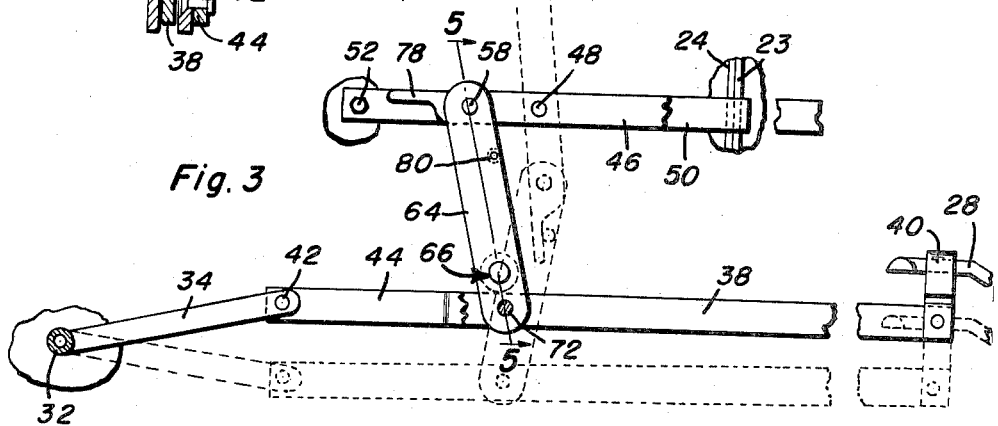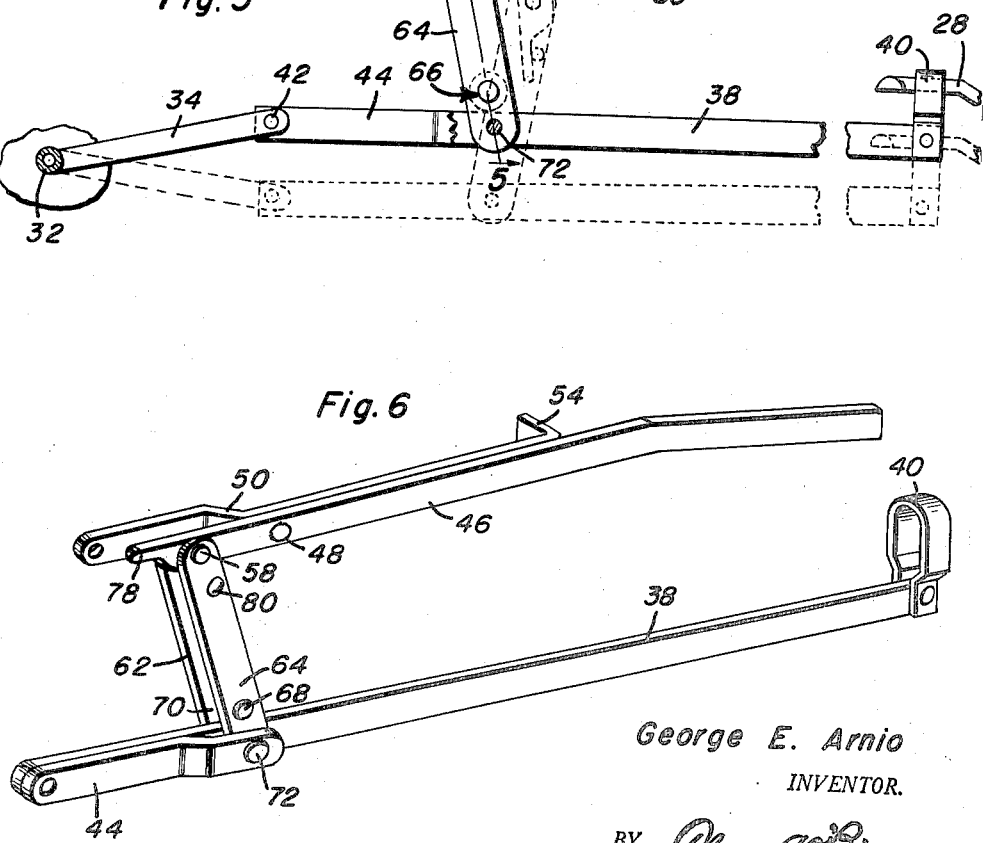

Patented Sept. 22, 1953

2,652,905

UNITED STATES PATENT OFFICE 2,652,905

TRACTOR HAND BRAKE

George E. Arnio, Oneonta, N. Y.

Application January 8, 1951, Serial No. 204,944

4 Claims. (Cl. 188—204)

This is a continuation in part of my co-pending application, Serial No. 48,506 filed September 9, 1948 and now Patent No. 2,626,022.

It is the primary object of the present invention to provide an attachment for a standard tractor which is not ordinarily provided with a hand brake, which serves the dual purpose of affording a means of actuating the left wheel brake and the right wheel brake arms simultaneously without affecting the independent operation of either and which constitutes a hand brake capable of being used for setting the brakes of the left and right rear wheels of the standard tractor.

Ancillary objects and features of novelty will become apparent to those skilled in the art, in following the description of the illustrated form of the invention.

In the drawings:

Figure 3 is a side elevational view of the attachment with portions being broken away;

Figure 4 is a fragmentary top view of a part of the tractor showing the mounting plate on it;

Figure 5 is an enlarged sectional view taken substantially on the line 5—5 of Figure 3 and in the direction of the arrows; and, Figure 6 is a perspective view of the attachment.

Figure 1:
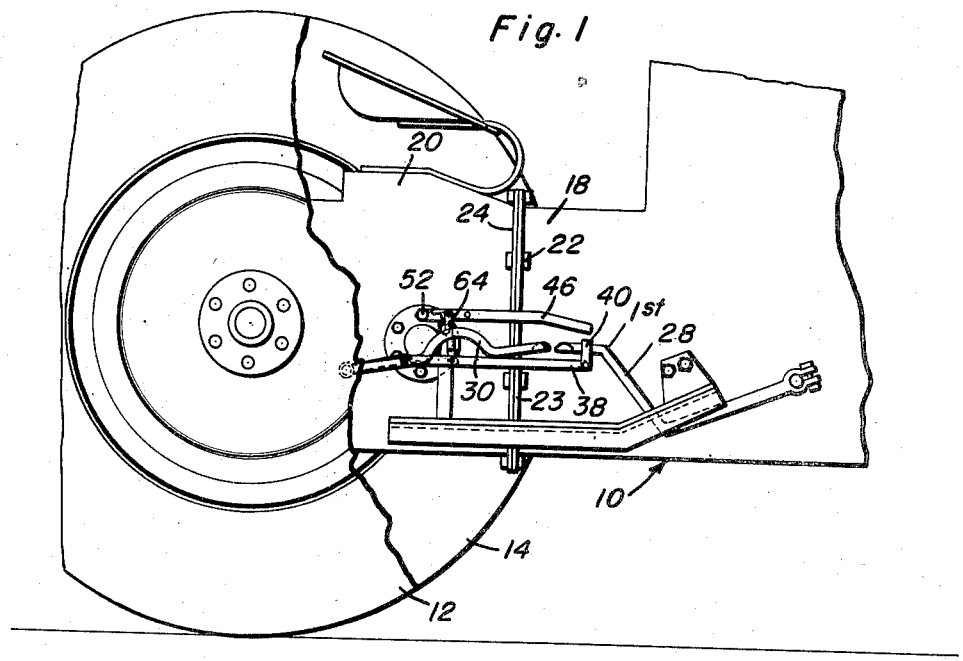
Figure 1 is a side view of a standard tractor with parts broken away and having the attachment secured thereto.
Figure 2:
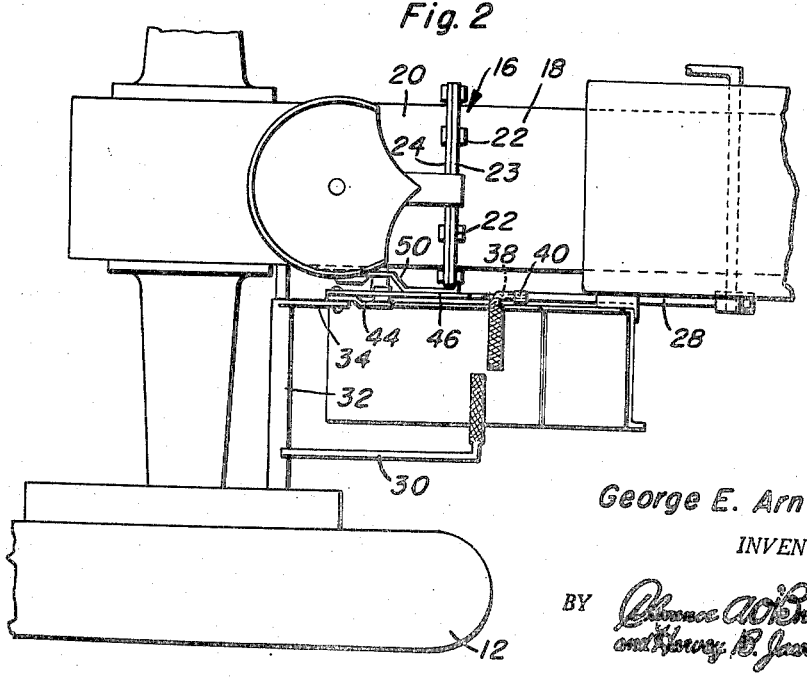
Figure 2 is a plan view of the structure in Figure 1.

Some standard makes of tractors are not provided with hand brakes. These types of tractors are usually equipped with two brake arms, one to operate the brakes in the left wheel at the rear of the tractor and the other to operate the brakes of the right wheel at the rear of the tractor.

It is sometimes desirable to operate both brake arms simultaneously. Accordingly, it becomes necessary for the tractor operator to bridge both brake pedals with one foot or swing both feet to one side of the tractor so as to operate both brake pedals at the same time. Moreover, a hand brake could be used to advantage in simultaneously applying the brakes of both rear wheels and holding the brakes set.

The illustrated attachment for a tractor provides for simultaneous and equalized application of force to both of the standard brake arms and also provides for hand operation instead of foot operation and in addition, provides for holding the two brake arms in a set position until manually released.

The tractor 10 fragmentarily illustrated in the drawings is provided with rear wheels 12 and 14, each of which has internal brake mechanism, not shown, which is purely conventional in character. The tractor frame 16 includes a transmission housing 18, together with a differential housing 20, the housings being connected together by means of bolts 22, which pass through the upstanding flanges 23 and 24 at the confronting ends of the transmission and differential housings. Other standard equipment includes the first brake arm 28 to operate the brakes of the wheel 14 and the second brake arm 30 to operate the brake mechanism of the wheel 12. The brake arm 30 includes in its structure the tube 32 which has the additional brake arm 34 connected therewith.

The attachment consists of a connecting bar 38 which has means at the ends thereof for attaching it to the brake arms 34 and 28 in such a way that it is capable of being moved freely under certain conditions. The connecting means comprises a clevis 40 at one end arranged to loosely overlie a part of the brake arm 28 near the pedal thereof and a pivot pin 42 at the opposite end of the bar 38 which is passed through openings at the ends of the bar 38, the brake arm 34 and a rod 44.

There is a device for displacing the bar 38 downwardly thereby operating the brake arms 34 and 28. The preferable means comprises a lever 46 which is pivoted by means of a pin 48 to a mounting bracket 50. The mounting bracket is fixed by means of a standard tractor bolt 52, or a number of bolts 52, at one end and is provided with a flange 54 at the other end which is disposed behind the flange 23 and held in place by means of one of the bolts 22, if found desirable. The lever has a pivot pin 58 passed through an opening near the lower end thereof, this pivot pin also passing through aligned openings in the links 62 and 64 which are arranged on opposite sides of the lever 46.

A bar contacting assembly 66 is located between the links 62 and 64 and includes a pin 68 which is passed through aligned openings in the links and a roller 70 disposed thereon which constitutes a bar contacting member for pushing the bar downwardly in response to pivotal movement of the lever 46. The lower end of the link 64 is provided with an aperture into which the pivot pin 72 is placed. This pivot pin passes through an opening in the rod 44 thereby pivotally connecting one link with the rod. It will be noted that by this type of construction the bar 38 is not mechanically connected with the links except through the medium of the rod 44 and this rod 44 is only connected with it through the agency of a pivot pin 42.

The lower end of the lever 46 has a finger 78 extending therefrom which is arranged to contact the sleeve 79 which is disposed on a pin 80, carried by and extending between the links 62 and 64. The pin 80 is offset with respect to a plane passed through the pivot pins 58 and 68 so that when the lever 46 is pulled to a predetermined position, an over-center locking arrangement results in view of the resistance to displacement of the bar 38 provided with forcing the brake arms 28 and 34 in a direction to actuate the brakes of the wheels 12 and 14.

In operation, the brake arm 28 may be operated by the user of the tractor 10 in order to apply the brakes of the wheel 14. During this operation, the brake arm 28 is moved downwardly an amount to take up the lost motion in the clevis 40. Thereafter, further movement of the brake arm 28 causes the bar 38 to pivot downwardly about the pin 42 as an axis. Since the links 62 and 64 only straddle the bar 38, it is capable of moving downwardly with the only resistance to movement being the friction at the pivot pin 42. Therefore, substantially no application of force is transmitted to the brake arm 34 while the brake arm 28 is being depressed.

When it is desired to operate the brake arm 34, it is done in the usual way. At this time the bar 38 is moved pivotally about the clevis structure 40 as an axis of rotation. Since only one link 64 is connected with the rod 44 and the connection is a pivotal one, the rod 44 will be moved downwardly pivotally with respect to the link 64 in operation to actuate the brakes of the wheel 12; therefore, substantially no force is applied to the brake arm 28 so that standard actuation of the brake arms is not affected by the presence of the attachment. The links 62, 64, rod 44 and roller 70 form lost motion connections between the bar 38 and lever 46 whereby downward pivoting of said bar 38 relative to said lever 46 is permitted.

However, when the lever 46 is operated, the bar 38 is depresed through the actions of the links 62 and 64 which carry the contact member 66, said contact member resting upon the upper surface of the bar 38. The greater the resistance to movement of the bar 38 offered by the arms 28 and 34, the less likelihood there is of depression of either end of the bar. By this means, substantially equal pressure application is involved when operating the brake arms 28 and 34 simultaneously.

In order to hold the brakes of the wheels 12 and 14 in a set position thereby providing a hand brake, the lever 46 is pulled rearwardly to such position that the finger 78 strikes the stop sleeve 79 and moves the links 62 and 64 pivotally so as to cause an over-center condition of the lever 46 and links 62 and 64. The links and lever will remain in this position until such time that the lever 46 is manually moved to its initial starting position (Figure 1).

Having described the invention, what is claimed as new is:

1. The combination with a pair of swingable brake arms operative independently to operate separate brake mechanisms independently, of a bar operatively connected at its ends to said arms, respectively, said bar being downwardly displaceable in a vertical plane to operate said arms simultaneously and swingable downwardly by independent operation of either arm, the operating connection between one end of said bar and one of said arms providing for lost motion between said bar and arm whereby said arms are operative independently of each other, a pivoted hand lever, and means operatively connecting said hand lever and bar for displacing said bar by operation of said lever in one direction comprising lost motion connections between the bar and lever providing for downward swinging of said bar independently of said lever.

2. The combination according to claim 1 wherein said last named lost motion connections comprise a linkage having a bar engaging roller thereon.

3. The combination according to claim 2, said linkage forming with said lever a past dead center lock for releasably maintaining said lever swung in said one direction.

4. The combination according to claim 1 wherein said first named operating connection comprises a clevis on said bar straddling said one arm.

GEORGE E. ARNIO.

References Cited in the file of this patent
UNITED STATES PATENTS

| Number | Name | Date |
|---|---|---|
| 2,443,331 | Stewart | June 15, 1948 |

FOREIGN PATENTS

| Number | Country | Date |
|---|---|---|
| 279,945 | Italy | Nov. 26, 1930 |